United States Patent
Mitchell et al.

[11] Patent Number: 6,062,061
[45] Date of Patent: May 16, 2000

[54] CRIMPING TOOL FOR A SEALING WASHER

[75] Inventors: George Edgar Mitchell, Troy; Gary Pitt Ford, Dayton, both of Ohio

[73] Assignee: General Motors Corporation, Detroit, Mich.

[21] Appl. No.: 09/185,680

[22] Filed: Nov. 4, 1998

[51] Int. Cl.[7] .................................................. B12D 53/20
[52] U.S. Cl. ........................................ 72/402; 29/243.517
[58] Field of Search ............................ 72/402, 399, 394; 29/243.517

[56] References Cited

U.S. PATENT DOCUMENTS

| | | | |
|---|---|---|---|
| 2,211,622 | 8/1940 | Hunziker | 72/402 |
| 4,597,284 | 7/1986 | Klann | 72/402 |
| 4,644,777 | 2/1987 | Kumeth | 72/402 |
| 4,727,742 | 3/1988 | Weaver | 72/402 |
| 5,195,350 | 3/1993 | Aikens | 72/402 |
| 5,715,723 | 2/1998 | Owens | 72/402 |

*Primary Examiner*—Daniel C. Crane
*Attorney, Agent, or Firm*—Robert M. Sigler

[57] ABSTRACT

A crimping tool for a sealing washer includes a cylindrical outer housing having a bore, a cylindrical inner housing disposed within the bore and fixed relative to the outer housing and a crimping arm pivotally mounted to the inner housing. The crimping tool also includes a drive mechanism for moving the outer housing relative to the inner housing to urge the crimping arm towards the inner housing to deform an object to be crimped.

14 Claims, 3 Drawing Sheets

CRIMPING TOOL FOR A SEALING WASHER

TECHNICAL FIELD

The present invention relates generally to crimping tools, and more particularly, to a crimping tool for a sealing washer in a motor vehicle.

BACKGROUND OF THE INVENTION

Sealing washers, as is known in the art, are frequently used to prevent leakage of a fluid. In a motor vehicle, and in particular an automotive vehicle, sealing washers are commonly utilized for this purpose. For example, in a brake system of the motor vehicle, a hydraulic fluid is transferred through a brake line from a brake pedal to a brake pad for slowing down or stopping rotation of a wheel. The brake line is commonly made from a material that can be flexible, semi-flexible, or rigid. Connectors, such as a brake line fitting, may be used to interconnect two brake lines, or connect a brake line with another component of the brake system. One type of a brake line fitting for connecting a brake line to another component of the brake system includes an end connector having a fastener such as a bolt passing through it. To prevent leakage of the hydraulic fluid from the brake line fitting, a sealing washer is placed on the bolt before the end connector and another sealing washer is placed on the bolt after the end connector.

In an assembly process, including an automobile assembly process, it may be desirable to preassemble a subassembly. The brake line fitting, as described, is well suited to this type of preassembly. In the past, a cap was placed on an end of the bolt to retain the second sealing washer on the bolt. The cap was removed and discarded when the brake line fitting was assembled to a brake caliper. While the removable cap works well, it is a solid waste that must be disposed. Thus, there is a need in the art to provide crimping tool for crimping a sealing washer on a fastener to eliminate the cap currently used and disposal thereof.

SUMMARY OF THE INVENTION

Accordingly, the present invention is a crimping tool for a sealing washer. The crimping tool includes a cylindrical outer housing having bore. A cylindrical inner housing is disposed within the bore and fixed relative to the outer housing. The crimping tool also includes a crimping arm pivotally mounted to the inner housing. The crimping tool further includes a mechanism for moving the outer housing relative to the inner housing to urge the crimping arm towards the inner housing to deform an object to be crimped.

One advantage of the present invention is that a crimping tool is provided that applies a crimp in a predetermined shape to a sealing washer to retain the sealing washer on a fastener such as a bolt. Another advantage of the present invention is that the crimping tool crimps a sealing washer in a triangular shape that improves the sealing ability of the washer. Yet another advantage of the present invention is that the crimping tool is adjustable to vary the shape of the crimp.

Other features and advantages of the present invention will be readily appreciated as the same becomes better understood after reading the subsequent description when considered in connection with the accompanying drawings.

DETAILED DESCRIPTION OF THE PREFERRED EMBODIMENT

Figure 1:
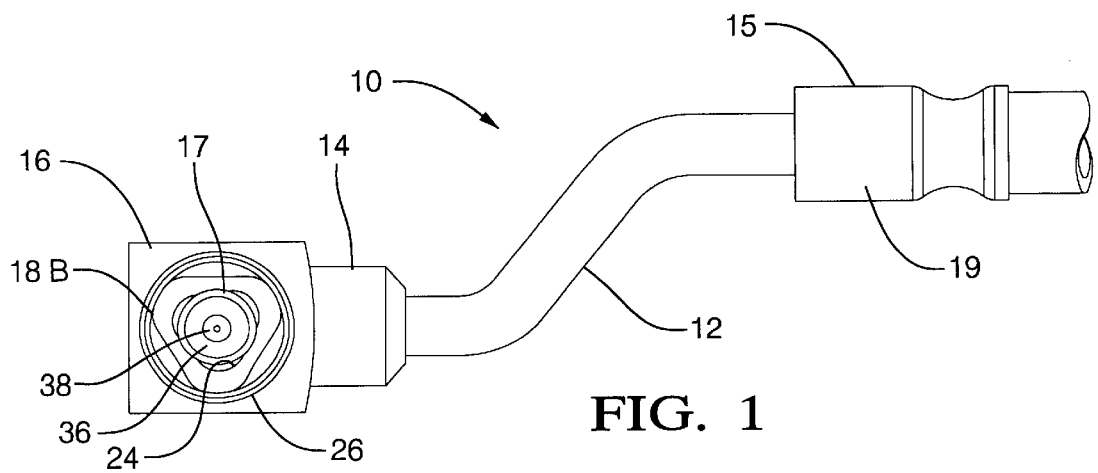
FIG. 1 is a plan view of a brake line fitting illustrating features of the present invention.
Figure 2:
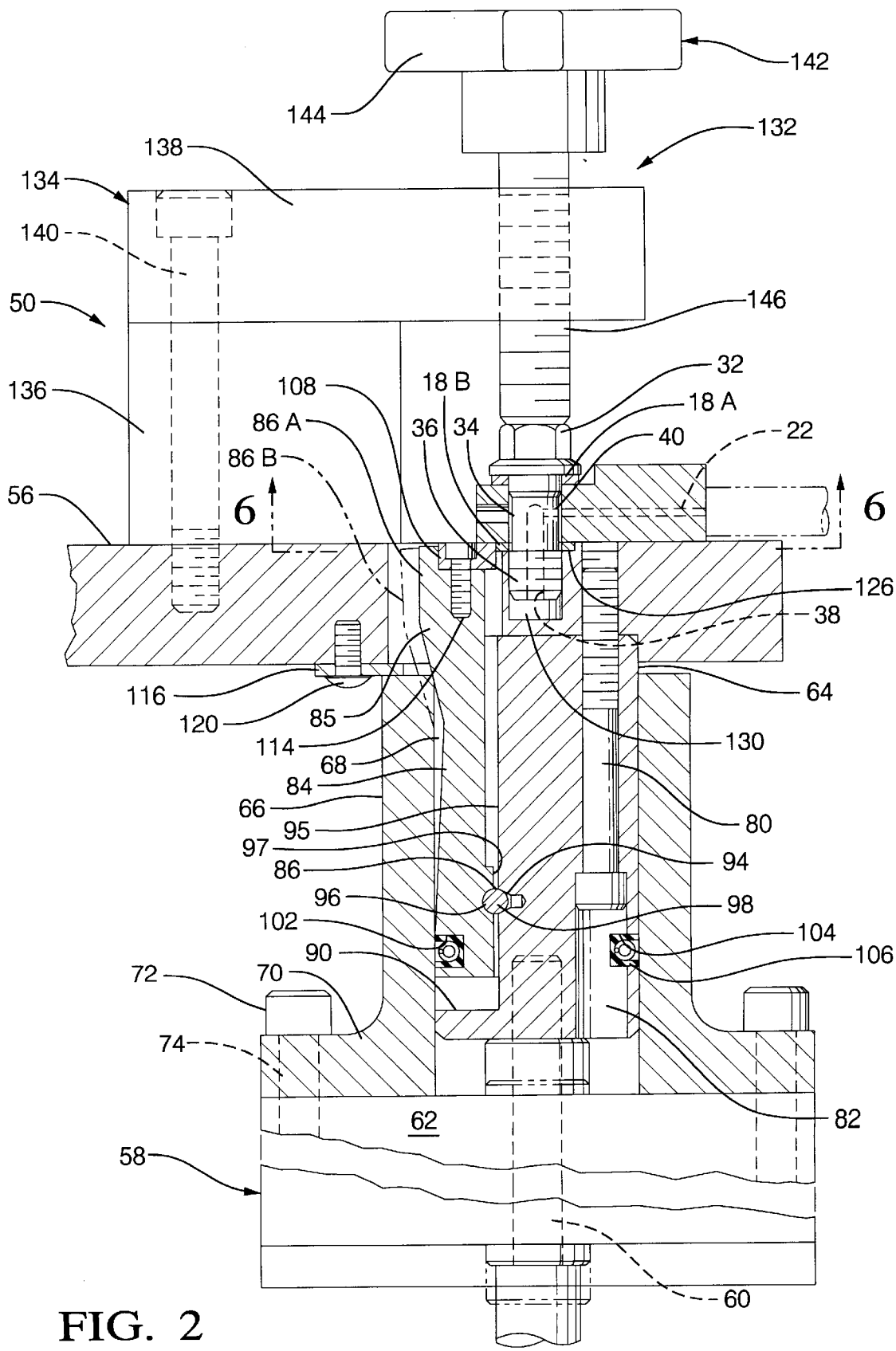
FIG. 2 is a fragmentary elevational view of a crimping tool, according to the present invention.

Referring to the drawings and in particular FIGS. 1 and 2, one embodiment of a brake line fitting 10, illustrating the features of the present invention, is shown for a brake system (not shown) on a motor vehicle such as an automotive vehicle (not shown). The brake line fitting 10 includes a brake line or conduit 12 and a connector 14 and 15 at each end of the brake line 12. In this example, the connector 14 includes a block end fitting 16 having a fastener such as a bolt 17 extending therethrough for threadably engaging a brake caliper (not shown) of the brake system. The brake line fitting 10 also includes a sealing washer 18a and 18b positioned before and after the block end fitting 16, respectively, for preventing any hydraulic fluid from exiting. The brake line fitting 10 includes a tubular end fitting 19 on the other end of the brake line 12. The tubular end fitting 19, as is known in the art, interconnects the brake line 12 to another brake line. Preferably, the block end fitting 16, tubular end fitting 19 and brake line 12 are integral and formed as one piece.

The block end fitting 16 is generally rectangular and includes a bore (not shown) extending axially therethrough. The block end fitting 16 also has a passageway 22 extending radially between the brake line 12 and the bore to provide a pathway for the hydraulic fluid from the brake line 12 through the block end fitting 16 to the bolt 17.

The block end fitting 16 also includes an opening 24 for the bore which is surrounded by a plurality of serrated rings 26 of increasing diameter. The serrated rings 26 improve the seal between the opening 24 for the bore in the block end fitting 16 and the sealing washer 18a, 18b by effectively increasing the sealing area between the opening 24 for the bore in the block end fitting 16 and the sealing washer 18a, 18b. The sealing washer 18a, 18b is annular as is known in the art. Preferably, the sealing washer 18a, 18b is made of a metal material such as copper.

The bolt 17, as illustrated in FIG. 2, includes a head 32 extending radially and a shaft 34 extending axially from the head 32. The shaft 34 includes a threaded portion 36 having an axial end. The axial end includes a first bore 38 extending axially partially into the shaft 34 and connecting with a second bore 40 extending radially into the shaft 34. The first bore 38 and second bore 40 form a pathway for the hydraulic fluid through the bolt 17 as is known in the art. Preferably, the bolt 17 is made from a metal material. It should be appreciated that the second bore 40 is aligned with the passageway 22 in the block end fitting 16 to complete the pathway for the hydraulic fluid between the bolt 31), block end fitting 16 and brake line 12.

It is desirable to preassemble the brake line fitting 10 by placing the first sealing washer 18a over the opening 24 for the bore in the block end fitting 16 and inserting the bolt 17 through the bore in the block end fitting 16. The second sealing washer 18b is placed on the shaft 34 of the bolt 17. The second sealing washer 18b is deformed by crimping it into a predetermined shape, such as a triangular shape with a crimping tool 50, according to the present invention, to retain it on the bolt 17.

Referring to FIGS. 2 through 8, a crimping tool 50, according to the present invention, is illustrated. In this example, the crimping tool 50 is used for crimping the sealing washer 18b on the bolt 17 for the brake line fitting 10. At the outset, it will be apparent to those skilled in the art that the present invention, though disclosed for a crimping the sealing washer 18b, may be used for deforming other types of objects.

The crimping tool 50 deforms an outer edge of the sealing washer 18b into a predetermined shape. Preferably, the predetermined shape is generally triangular. Advantageously, the triangular shape of the crimped sealing washer 18b positions the sealing washer 18b concentric with an axis of rotation of the bolt 17 to improve a seal formed between the sealing washer 18b and the opening 24 for the bore in the block end fitting 16. Also, the improved seal interface between the sealing washer 18b and the opening 24 for the bore in the block end fitting 16 reduces any potential side slippage at the connection between the brake line fitting 10 and a brake caliper in this example. Further, the sealing washer 18b is securely retained on the bolt 17 with a triangularly shaped crimp to preassemble the brake line fitting 10.

Advantageously, the crimping tool 50 utilizes a minimum of moving parts. The crimping tool 50 includes a base plate 56. The base plate 56 is a generally solid rectangular member. The crimping tool 50 includes a drive mechanism such as a pneumatic cylinder, generally indicated at 58, operatively attached to the base plate 56. The pneumatic cylinder 58 includes a fixed or stationary center guide portion 60 and a moveable piston portion 62 slideably disposed about the center guide position 60. The pneumatic cylinder 58 receives power in the form of air pressure to operably control the crimping tool 50 in a manner to be described. The pneumatic cylinder 58 is operably connected to a pressure regulator (not shown), which regulates the air pressure within the pneumatic cylinder 58, as is known in the art. For convenience, the pressure regulator may be mounted to the base plate 56. It should be appreciated that the pneumatic cylinder 58 is conventional and known in the art.

Figure 4:
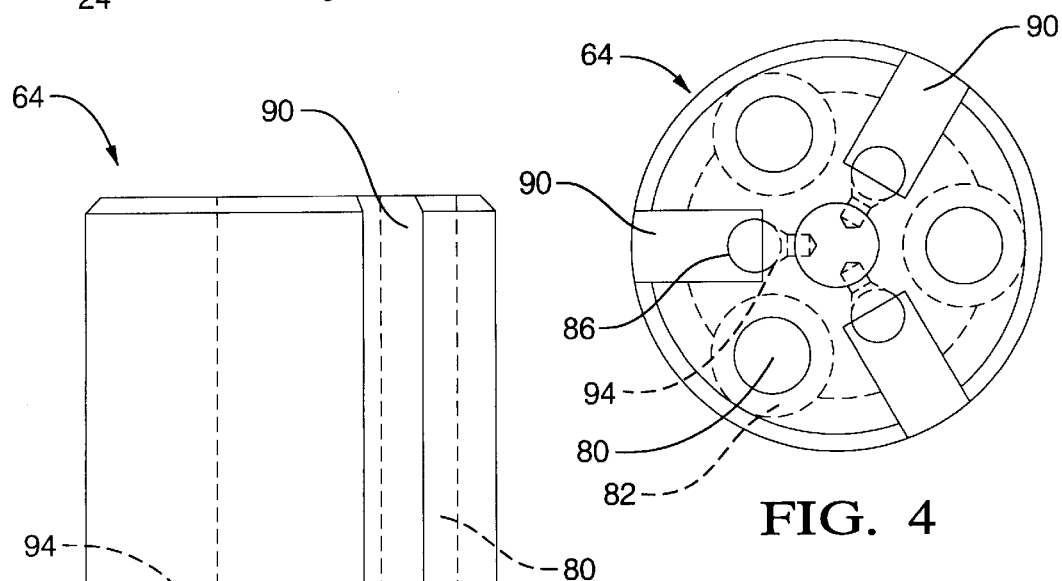
FIG. 4 is a plan view of the inner housing of FIG. 3.
Figure 3:
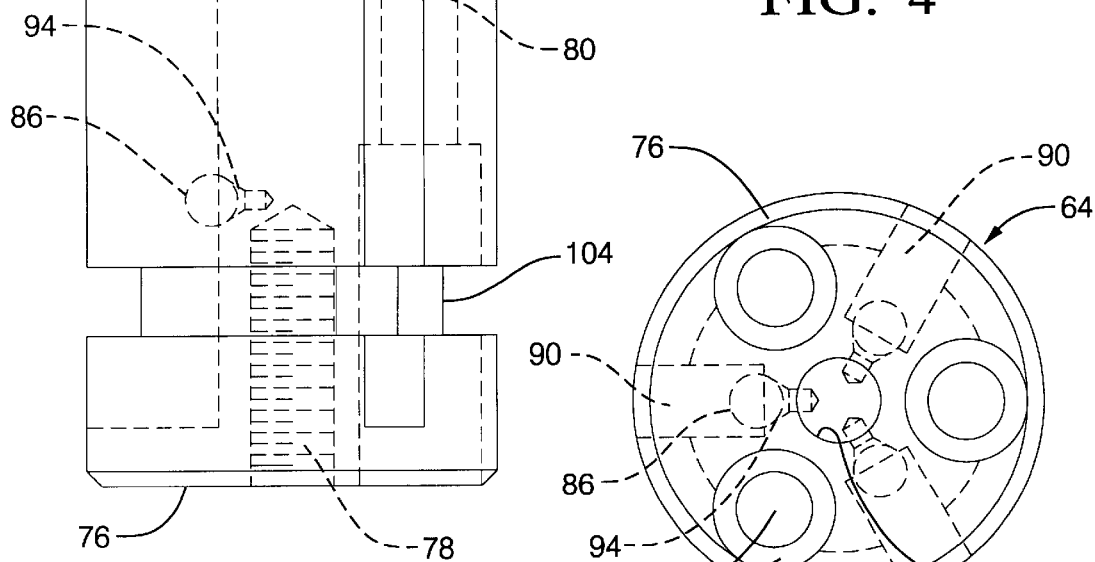
FIG. 3 is an elevational view of an inner housing, according to the present invention, of the crimping tool of FIG. 2.
Figure 5:
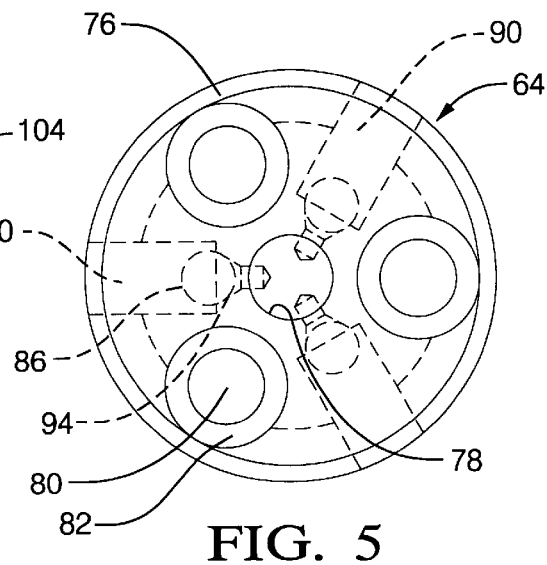
FIG. 5 is a bottom view of the inner housing of FIG. 3.

The crimping tool 50 includes a fixed or stationary inner housing 64, as illustrated in FIGS. 3, 4 and 5, and a moveable outer housing 66 slideably disposed about the inner housing 64. The outer housing 66 is an elongated cylinder having a bore 68 extending axially. A lower end of the outer housing 66 includes a flange 70 extending radially for securing the outer housing 66 to the piston portion 62 of the pneumatics cylinder 58 by suitable means, such as a fastener 72 which passes through an aperture 74 in the flange 70. It should be appreciated that the outer housing 66 moves with the piston portion 62 of the pneumatic cylinder 58.

The inner housing 64 is an elongated solid cylinder. The inner housing 64 is operatively connected to the base plate 56 and the center guide portion 60 of the pneumatic cylinder 58. For example, a lower end 76 of the inner housing 64 illustrated in FIG. 8, includes a threaded bore 78 extending axially partially into the inner housing 64 for receiving the center guide portion 60 of the pneumatic cylinder 58. The inner housing 64 is secured to the base plate 56 by a suitable means, such as a fastener 80. For example, the inner housing 64 includes a transversely extending bore 82 for receiving the fastener 80. Preferably there are three transversely extending bores 82 spaced approximately one-hundred twenty degrees (120°) apart, for receiving corresponding fasteners 80, to attach the inner housing 64 to the base plate 56.

The crimping tool 50 includes at least one movable crimping arm 84 that forms a crimp in the sealing washer 18b. The crimping arm 84 is pivotal about a fixed or stationary pivot point 86 to be described. The crimping arm 84 is illustrated in a crimping position at 86a and a resting position at 86b. Preferably, the crimp is formed by three crimping arms 84, each spaced one hundred twenty degrees (120°) apart. An outer surface of the inner housing 64 includes a transversely extending slot 90 having a generally U-shape. It should be appreciated, that in this example, there are three slots 90 spaced one-hundred twenty degrees (120°) apart, each for receiving a corresponding crimping arm 84.

In this example, the pivot point 86 is positioned near a lower end of the crimping arm 84. The pivot point 86 is defined in one part by a semi-circular indentation 94 in a surface 95 of the inner housing 64, and in another part by an opposing semi-circular indentation 96 in an inner surface 97 of the crimping arm 84. To form the pivot point 86, a pivot ball 98 is placed between the crimping arm 84 and the inner housing 64 within the indentations 94, 96. An outer surface of the crimping arm 84 has a circumferentially extending groove 102 positioned near a lower end of the crimping arm 84. The surface 95 of the inner housing 64 has a similar circumferentially extending groove 104 positioned in line with the groove 102 in the crimping arm 84. To operatively retain the crimping arm 84 on the inner housing 64, a circular spring mechanism 106, such as an o-ring, is placed within the groove 104 in the inner housing 64 and the groove 102 in the crimping arm 84. Advantageously, the circular spring mechanism 106 urges the crimping arm 84 back to the resting position 86b, after the crimping operation is complete. A portion 85 of crimping arm 84 is provided with a radially outer surface that slants radically outward in the direction of washer 18 and forming plate 108 for engagement by outer housing member 66 to convert axial force exerted by housing member 66 into radial inward, pivoting, force on crimping arm 84.

Figure 6:
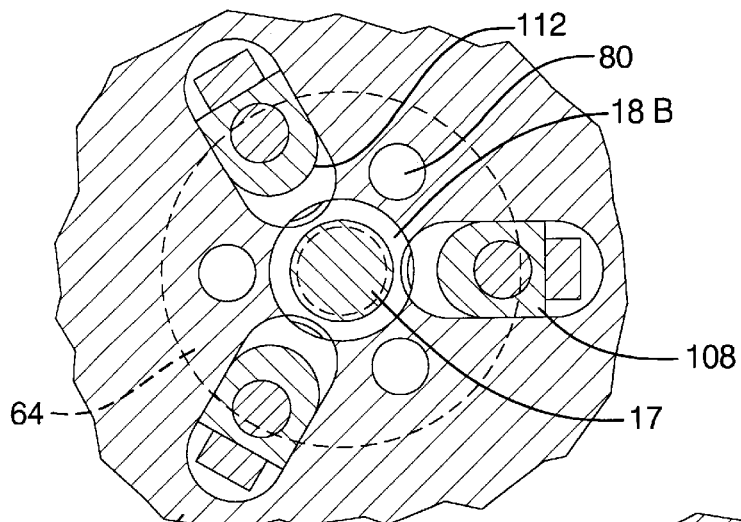
FIG. 6 is a sectional view taken along line 6—6 of FIG. 2 illustrating crimping arms in a resting position.
Figure 7:
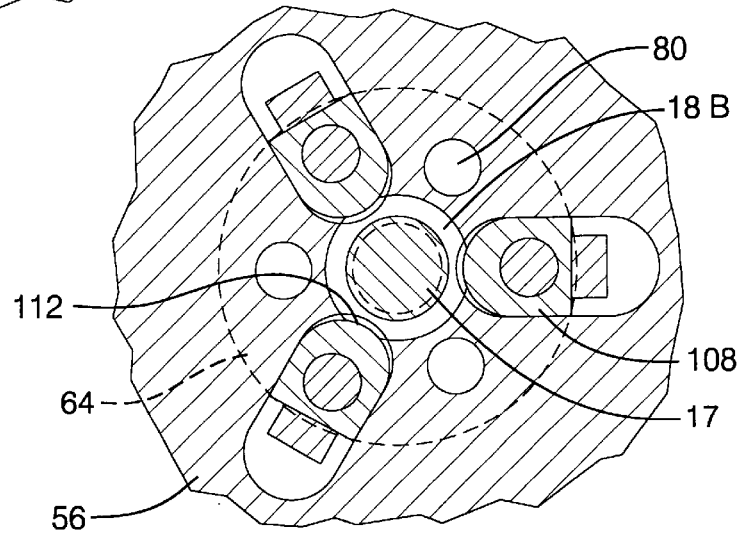
FIG. 7 is a view similar to FIG. 6 illustrating the crimping arms in a crimping position.
Figure 8:
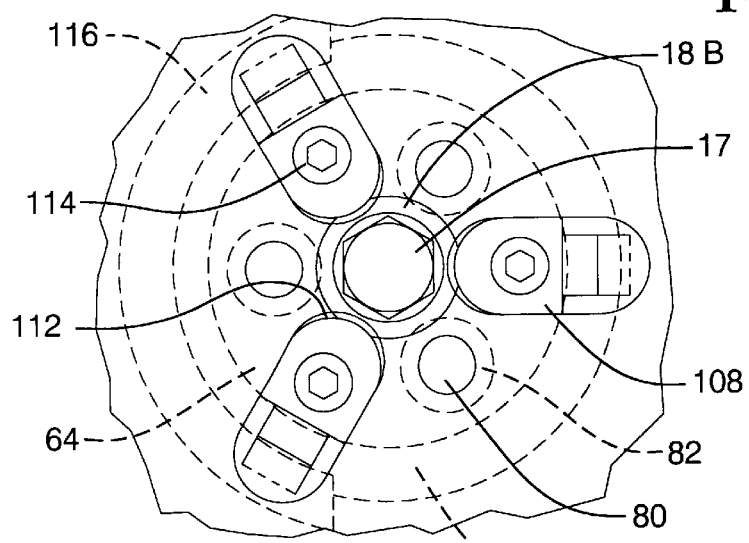
FIG. 8 is a plan view of the crimping arms of the crimping tool of FIG. 2.

The crimping tool 50 includes a generally planar forming plate 108, as illustrated in FIGS. 6, 7 and 8, is positioned on an upper end of the crimping arm 84, extending perpendicular to the crimping arm 84. The forming plate 108 deforms the object to be crimped into a predetermined shape. Therefore, the shape of the forming plate 108 determines the predetermined shape of the crimped sealing washer 18b. In this example, an end 112 of the forming plate 108 contacting the sealing washer 18b is radial. Preferably, the forming plate 108 is removable, so that it can be replaced if excessively worn. In this example, the forming plate 108 is attached by a fastener such as a bolt 114 to an upper end of the crimping arm 84.

The crimping tool 50 also includes a stop-plate 116 for controlling the depth of the crimp. The stop-plate 116 is a generally planar C-shaped member attached to the base plate 56, between the base plate 56 and an upper end of the outer housing 66 with a fastener such as a bolt 120. The stop-plate 116 is positioned so as to provide a stop for an upper end of the outer housing 66, as the outer housing 66 is raised by the pneumatic cylinder 58. A thickness of the stop-plate 116 controls the depth of the crimp, by controlling the transverse motion of the outer housing 66. It should be appreciated that the greater the distance traveled, the deeper the crimp, as will be described.

The top of the base plate 56 includes an alignment cavity 126, resembling an annular indentation, for holding the object to be crimped, which in this example is the sealing washer 18b. The top of the base plate 56 also includes a bore extending axially from the alignment cavity 126, for receiving the shaft 34 of the bolt 17 in a manner to be described.

The crimping tool 50 also includes a holding fixture, generally indicated as 132, for holding the brake line fitting 10 on the crimping tool 50 during the crimping operation. The holding fixture 132 includes a support block 134 mounted to the base plate 56. The support block 134 includes a vertical spacer 136, for setting a vertical height, and a horizontal spacer 138 for setting a horizontal distance of the holding fixture 132. Advantageously, the vertical spacer 136 and horizontal spacer 138 are separate blocks retained together, with a fastener such as a bolt 140 extending therethrough the support block 134 and into the base plate 56.

The holding fixture 132 also includes a clamping mechanism that rigidly holds the brake line fitting 10 on the crimping tool 50 during the crimping operation. It should be appreciated that, in this example, the clamping mechanism is a screw clamp 142, although other types of clamps such as a toggle clamp can also the used. The screw clamp 142 includes a handle 144 having a threaded shaft 146 extending perpendicular to the handle 144. Preferably, an end of the vertical spacer 136 includes a threaded bore (not shown) extending radially therethrough for receiving the shaft 146. The screw clamp 142 is engaged by rotating the handle 144 to exert a force on the brake line fitting 10 that prevents movement of the brake line fitting 10 during the crimping operation.

In operation, the sealing washer 18b is placed in the alignment cavity 126 in the base plate 56. The brake line fitting 10 is placed on the crimping tool 50, such that the axial end of the bolt 17 is seated within the bore 130 in the base plate 56. Preferably, the block end fitting 16 is supported by the base plate 56. The clamping mechanism, which in this example is a screw clamp 142, is engaged to rigidly hold the brake line fitting 10 in place.

The pneumatic cylinder 58 is pressurized, such as by activating a switch (not shown), as is known in the art. The piston portion 62 moves axially, thus moving the outer housing 66 with respect to the inner housing 64. The crimping arm 84 is urged radially inwards towards the inner housing 64, as illustrated at 86a, by the movement of the outer housing 66 towards the stop plate 116. By limiting the travel of the outer housing 66, the stop plate 116 controls the depth of the crimp. It should be appreciated that, in this example, the travel of the outer housing 66 is only about ¼ inch. As the crimping arm 84 is urged radially inward toward the inner housing 64, the forming plate 108 pushes against the outer edge of the sealing washer 18b, to deform it into the predetermined shape. After the sealing washer 18b is deformed, the pneumatic cylinder 58 is depressurized, such as by releasing a valve (not shown), and the outer housing 66 returns back to its original position. The O-ring spring 106 urges the crimping arm 84 outward radially to its resting position, as illustrated at 86b. It should be appreciated that the transverse speed of the piston portion 62 of the pneumatic cylinder 58 can be controlled by a pressure regulator (not shown), as is known in the art. The screw clamp 142 may then be disengaged, such as by unscrewing the handle 144, of this example. The brake line fitting 10 may then be removed from the crimping tool 50.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A crimping tool for a washer comprising:
    a cylindrical outer housing having a bore;
    a cylindrical inner housing disposed within said bore, said outer housing being axially movable relative to said inner housing;
    a crimping arm mounted on said inner housing, and extending axially and pivotable radially relative to said inner housing, said crimping arm being shaped for engagement with the outer housing moving axially to produce pivotal motion of the crimping arm towards said inner housing; and
    a drive mechanism for moving said outer housing axially relative to said inner housing toward the washer to urge said crimping arm towards said inner housing to crimp the washer radially inward.

2. A crimping tool as set forth in claim 1 including a base plate, said inner housing being fixedly attached to said base plate.

3. A crimping tool as set forth in claim 2 including a stop plate mounted to said base plate for limiting axial movement of said outer housing.

4. A crimping tool as set forth in claim 3 including a forming plate positioned on an upper end of said crimping arm for deforming the object into a predetermined shape.

5. A crimping tool as set forth in claim 4 wherein said forming plate is removable.

6. A crimping tool as set forth in claim 4 wherein the predetermined shape is triangular.

7. A crimping tool as set forth in claim 1 including a plurality of crimping arms spaced one-hundred twenty degrees apart around said inner housing to deform the object into a triangular shape.

8. A crimping tool as set forth in claim 1 wherein said drive mechanism is a pneumatic cylinder.

9. A crimping tool as set forth in claim 1 in which the crimping arm has a portion with a radially outwardly slanted surface for engagement by the outer housing moving axially toward the washer so as to press the crimping arm inward to crimp the washer.

10. A crimping tool for crimping a sealing washer on a bolt comprising:
    a base plate;
    a cylindrical outer housing having an axially extending bore;
    a cylindrical inner housing disposed within said axially extending bore of said outer housing, wherein one end of said inner housing is fixedly attached to said base plate;
    a crimping arm pivotally mounted to said inner housing;
    a holding mechanism for holding the bolt and sealing washer on said base plate;
    a stop plate mounted to said base plate between said base plate and an end of said outer housing for limiting axial movement of said outer housing;

a forming plate positioned on an upper end of said crimping arm for deforming the sealing washer into a predetermined shape; and a pneumatic cylinder for moving said outer housing axially relative to said inner housing to urge said crimping arm towards said inner housing while deforming the sealing washer with the upper end of said crimping arm.

11. A crimping tool as set forth in claim 10 wherein said forming plate is removable.

12. A crimping tool as set forth in claim 10 wherein the predetermined shape is triangular.

13. A crimping tool as set forth in claim 12 including three crimping arms spaced one-hundred twenty degrees apart around said inner housing to deform the sealing washer into a triangular shape.

14. A crimping tool as set forth in claim 11 wherein the holding mechanism is a clamp.

* * * * *